(12) United States Patent
Shin et al.

(10) Patent No.: US 10,879,753 B2
(45) Date of Patent: Dec. 29, 2020

(54) BRUSHLESS DIRECT CURRENT MOTOR

(71) Applicant: Hanon Systems, Daejeon (KR)

(72) Inventors: Hyeon Jae Shin, Daejeon (KR); Ho Bin Im, Daejeon (KR); Kyung Hun Jung, Daejeon (KR); Seong Kook Cho, Daejeon (KR); Jae Kyoung Jin, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 16/063,590

(22) PCT Filed: May 8, 2017

(86) PCT No.: PCT/KR2017/004745
§ 371 (c)(1),
(2) Date: Jun. 18, 2018

(87) PCT Pub. No.: WO2018/062656
PCT Pub. Date: Apr. 5, 2018

(65) Prior Publication Data
US 2019/0245395 A1 Aug. 8, 2019

(30) Foreign Application Priority Data

Sep. 29, 2016 (KR) .................. 10-2016-0125183
Apr. 24, 2017 (KR) .................. 10-2017-0052375

(51) Int. Cl.
*H02K 1/27* (2006.01)
*H02K 29/03* (2006.01)
*H02K 1/14* (2006.01)

(52) U.S. Cl.
CPC ............. *H02K 1/276* (2013.01); *H02K 1/146* (2013.01); *H02K 1/2766* (2013.01); *H02K 29/03* (2013.01)

(58) Field of Classification Search
CPC ........ H02K 29/03; H02K 19/04; H02K 21/16; H02K 21/14; H02K 21/24; H02K 1/276;
(Continued)

(56) References Cited

U.S. PATENT DOCUMENTS

| 2014/0035422 A1* | 2/2014 | Mikami | ............... H02K 15/03 310/156.71 |
| 2015/0084466 A1* | 3/2015 | Tsuchiya | ............... H02K 1/243 310/156.07 |

FOREIGN PATENT DOCUMENTS

| CN | 103580330 A | 2/2014 |
| JP | 2002199639 A | 7/2002 |

(Continued)

*Primary Examiner* — Bryan R Perez
(74) *Attorney, Agent, or Firm* — Norton Rose Fulbright US LLP; James R. Crawford (57) ABSTRACT

Disclosed is a BLDC motor, including: a stator which is provided with a plurality of teeth extending toward an inner side of a core and pole shoes each extending to be formed at radial inner end parts of the teeth; and rotors which are disposed at an inner side of the stator surrounded by the pole shoes while being spaced apart from the stator and have a plurality of permanent magnets coupled to cores thereof. Inner circumferential surfaces of the circumferential end parts of the pole shoe may be formed so that a distance of the inner circumferential surfaces of the circumferential end parts of the pole shoe from the outer circumferential surface of the rotor increases as the inner circumferential surfaces of the circumferential both end parts of the pole shoe is far away circumferentially from a central line CL of the pole shoe.

6 Claims, 7 Drawing Sheets

(58) Field of Classification Search
CPC .......... H02K 1/27; H02K 1/148; H02K 1/146; H02K 1/14; H02K 1/2773; H02K 1/278; H02K 1/08; H02K 1/17; H02K 1/24; H02K 1/2786; H02K 1/16; H02K 1/272
See application file for complete search history.

(56) References Cited

FOREIGN PATENT DOCUMENTS

| | | |
|---|---|---|
| JP | 2003-047181 A | 2/2003 |
| JP | 2003-284269 A | 10/2003 |
| JP | 2008099418 A | 4/2008 |
| JP | 2014-107939 A | 6/2014 |
| JP | 2014-209828 A | 11/2014 |
| KR | 10-1603667 B1 | 3/2016 |
| KR | 2016-0024801 A | 3/2016 |

* cited by examiner

(a) COUNTER ELECTROMOTIVE FORCE WAVEFORM OF PRIOR ART

FIG. 5

(b) COUNTER ELECTROMOTIVE FORCE WAVEFORM OF PRESENT INVENTION

BRUSHLESS DIRECT CURRENT MOTOR

This application is a § 371 of International Application No. PCT/KR2017/004745 filed May 8, 2017, and claims priority from Korean Patent Applications Nos. 10-2016-0125183 filed Sep. 29, 2016 and 10-2017-0052375 filed Apr. 24, 2017.

TECHNICAL FIELD

The present invention relates to a BLDC motor, and more particularly, to a BLDC motor capable of reducing a cogging torque and a torque ripple in an inner-rotor type BLDC motor.

BACKGROUND ART

A brushless direct current (BLDC) motor may prevent friction and wear which are disadvantages of the existing DC motor and have relatively high efficiency. Therefore, recently, hybrid cars tend to adopt the BLDC motor as a motor for rotating a cooling fan.

The BLDC motor is a motor that does not have a brush and a commutator necessary for a DC motor but has an electronic commutation mechanism installed therein. Among the BLDC motors, an inner-rotor type BLDC motor includes a rotor and a stator, in which the rotor whose center is provided with a permanent magnet rotates and the stator whose circumference is wound with a drive coil is fixed. That is, the stator whose outer side is wound with the drive coil is fixed and the rotor whose inner side is provided with the permanent magnet rotates.

Figure 1:
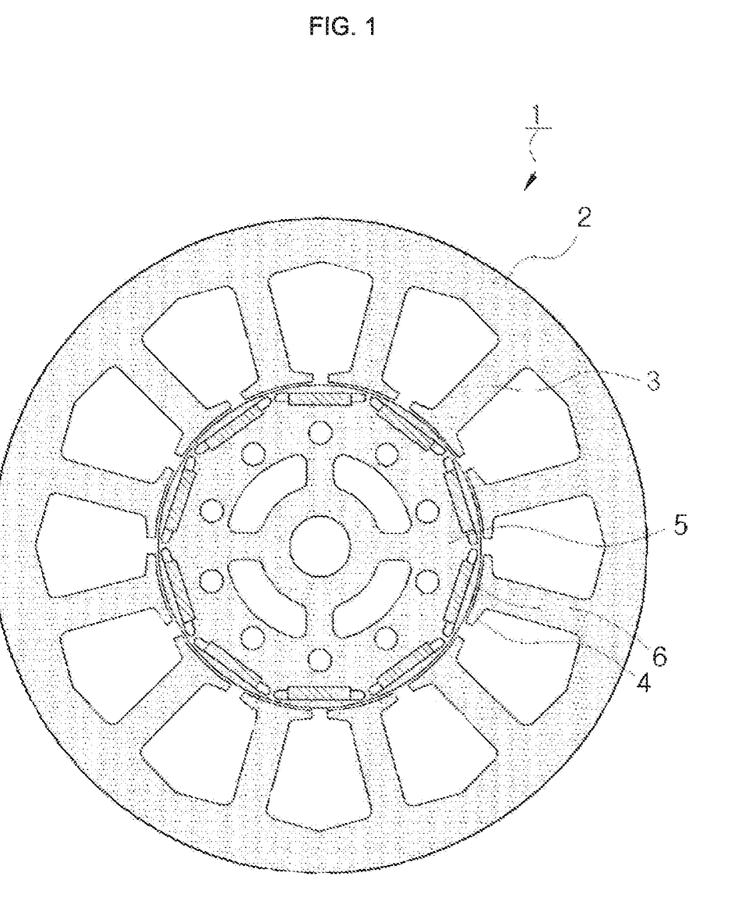
FIG. 1 is a partial schematic view illustrating the conventional BLDC motor.

In such a conventional inner-rotor type BLDC motor 1, as illustrated in FIG. 1, a rotor 5 is disposed on an inner side of a stator 2 while being spaced apart from each other at a predetermined interval. The stator 2 has a ring shape and is provide with a plurality of teeth 3 which protrude inwardly of the stator 2 and are disposed radially, in which the teeth 3 are wound with a drive coil and inner end parts of the teeth 3 adjacent to the rotor 5 are provided with a pole shoe 4. In addition, the rotor 5 is coupled to the plurality of permanent magnets 6 which are spaced apart from each other along a circumferential direction.

By the way, the BLDC motor has different magnitudes of magneto-resistance (enough magnitude to obstruct a flow of magnetic flux) depending on rotating positions of the rotor when the rotor is rotated, and the difference in the magneto-resistance causes a pulsation of a motor torque. In the permanent magnet type motor, the pulsating phenomenon of the torque occurring when the rotor rotates prior to applying electricity to the coil of the motor is called a cogging torque. Due to the pulsation of the torque, the motor has an excitation source which causes vibration and noise. As a result, there is a problem that the noise of the motor occurs in a cooling fan or the like which is a system driven by the motor.

Accordingly, there is a need to improve noise and vibration characteristics of the motor by reducing a torque ripple which is a fluctuation width of a cogging torque of the motor.

RELATED ART DOCUMENT

Patent Document

KR 10-1603667 B1 (Mar. 9, 2016)

DISCLOSURE

Technical Problem

An object of the present invention is to provide a BLDC motor capable of reducing a cogging torque and a torque ripple of a motor by reducing a magneto-resistance between a stator and a rotor.

Technical Solution

In one general aspect, a BLDC motor includes: a stator 100 which is provided with a plurality of teeth 120 extending toward an inner side of a core 110 and pole shoes 130 each extending to be formed at radial inner end parts of the teeth 120; and rotors 200 which are disposed at an inner side of the stator 100 surrounded by the pole shoes 130 while being spaced apart from the stator 100 and have a plurality of permanent magnets 220 coupled to cores 210 thereof, in which an outer circumferential surface of the rotor 200 may have a circular shape, an outer circumferential surface of a part of an area corresponding to a specific angle range with respect to a rotation center C of the rotor 200 may be formed as a rectilinear straight portion 230, predetermined areas of central parts of radial inner circumferential surfaces of the pole shoe 130 may have an arch shape, and the inner circumferential surfaces of the circumferential both end parts 131 of the pole shoe 130 may be formed so that a distance of the inner circumferential surfaces of the circumferential both end parts 131 of the pole shoe 130 from the outer circumferential surface of the rotor 200 increases as the inner circumferential surfaces of the circumferential both end parts 131 of the pole shoe 130 is far away circumferentially from a central line CL of the pole shoe.

The inner circumferential surfaces of the both end parts 131 of the pole shoe 130 may be formed as the rectilinear straight portions 132.

The inner circumferential surfaces of the both end parts 131 of the pole shoe 130 may be formed symmetrically with respect to the central line CL of the pole shoe 130.

In addition, an angle range θt between start points A and A' of the inner circumferential surfaces of the circumferential both end parts 131 of the pole shoe 130 which is formed so that the distance of the inner circumferential surfaces of the circumferential both end parts 131 of the pole shoe 130 from the outer circumferential surface of the rotor 200 increases as the inner circumferential surfaces of the circumferential both end parts 131 of the pole shoe 130 are far away circumferentially from the central line CL of the pole shoe is larger (θm<θt) than an angle range θm between outer side ends Mo and Mo' of the permanent magnets 220 adjacent to each other with respect to the rotation center C of the rotor 200.

The straight portion 230 of the outer circumferential surface of the rotor 200 may be disposed at a position between the permanent magnets 220 adjacent to each other.

An angle range θc between a start point S and an end point E of the straight portion 230 may be larger (θm<θc) than the angle range θm between the outer side ends Mo and Mo' of the permanent magnets 220 adjacent to each other with respect to the rotation center C of the rotor 200.

The angle range θt between the start points A and A' of the inner circumferential surfaces of the circumferential both end parts 131 of the pole shoe 130 which is formed so that the distance of the inner circumferential surfaces of the circumferential both end parts 131 of the pole shoe 130 from the outer circumferential surface of the rotor 200 increases as the inner circumferential surfaces of the circumferential both end parts 131 of the pole shoe 130 are far away circumferentially from the central line CL of the pole shoe may be larger (θt>θc) than the angle range θc between the start point S and the end point E of the straight portion 230.

Advantageous Effects

The BLDC motor of the present invention has an advantage in that the cogging torque and the torque ripple can be reduced by reducing the magneto-resistance between the stator and the rotor.

In addition, as the cogging torque of the motor can be reduced and the torque ripple can be reduced, the counter electromotive force waveform becomes sinusoidal, thereby reducing the noise and vibration of the motor.

BEST MODE

Hereinafter, a BLDC motor according to an exemplary embodiment of the present invention having a configuration as described above will be described in detail with reference to the accompanying drawings.

Figure 2:
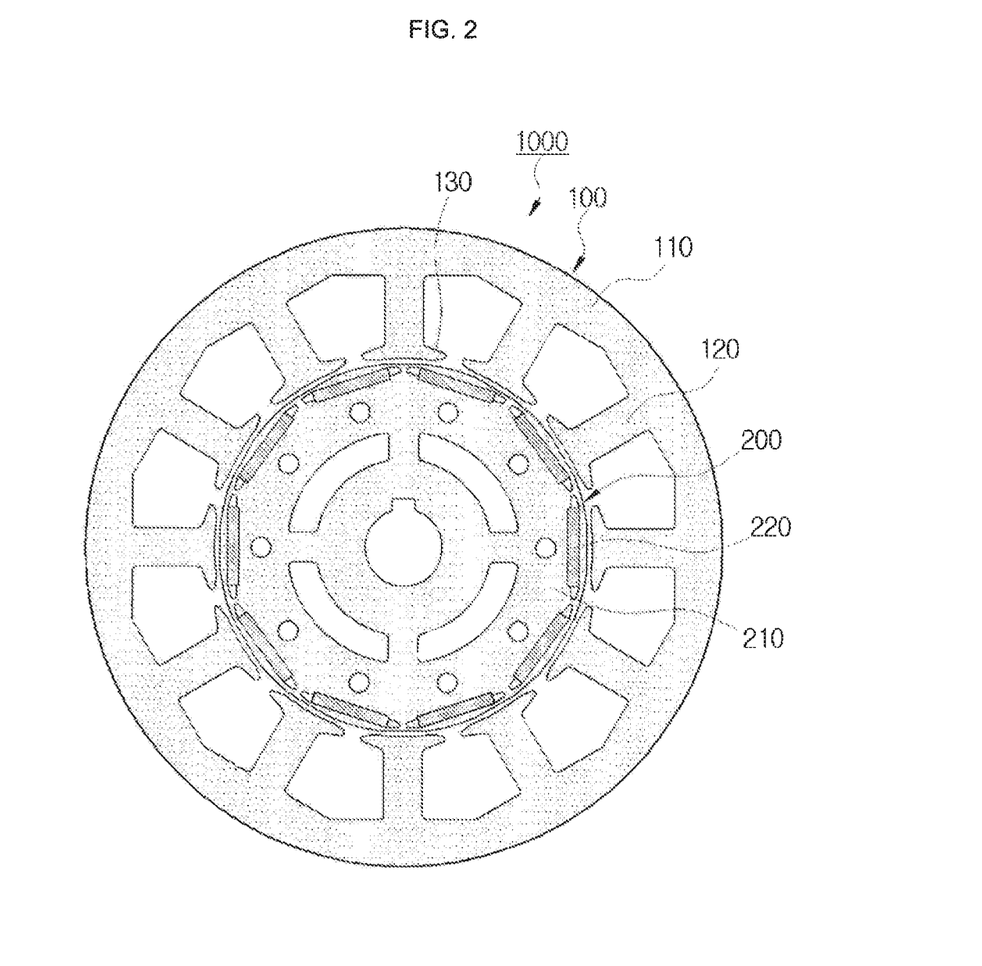
FIG. 2 is a schematic view illustrating a BLDC motor according to an exemplary embodiment of the present invention.
Figure 3:
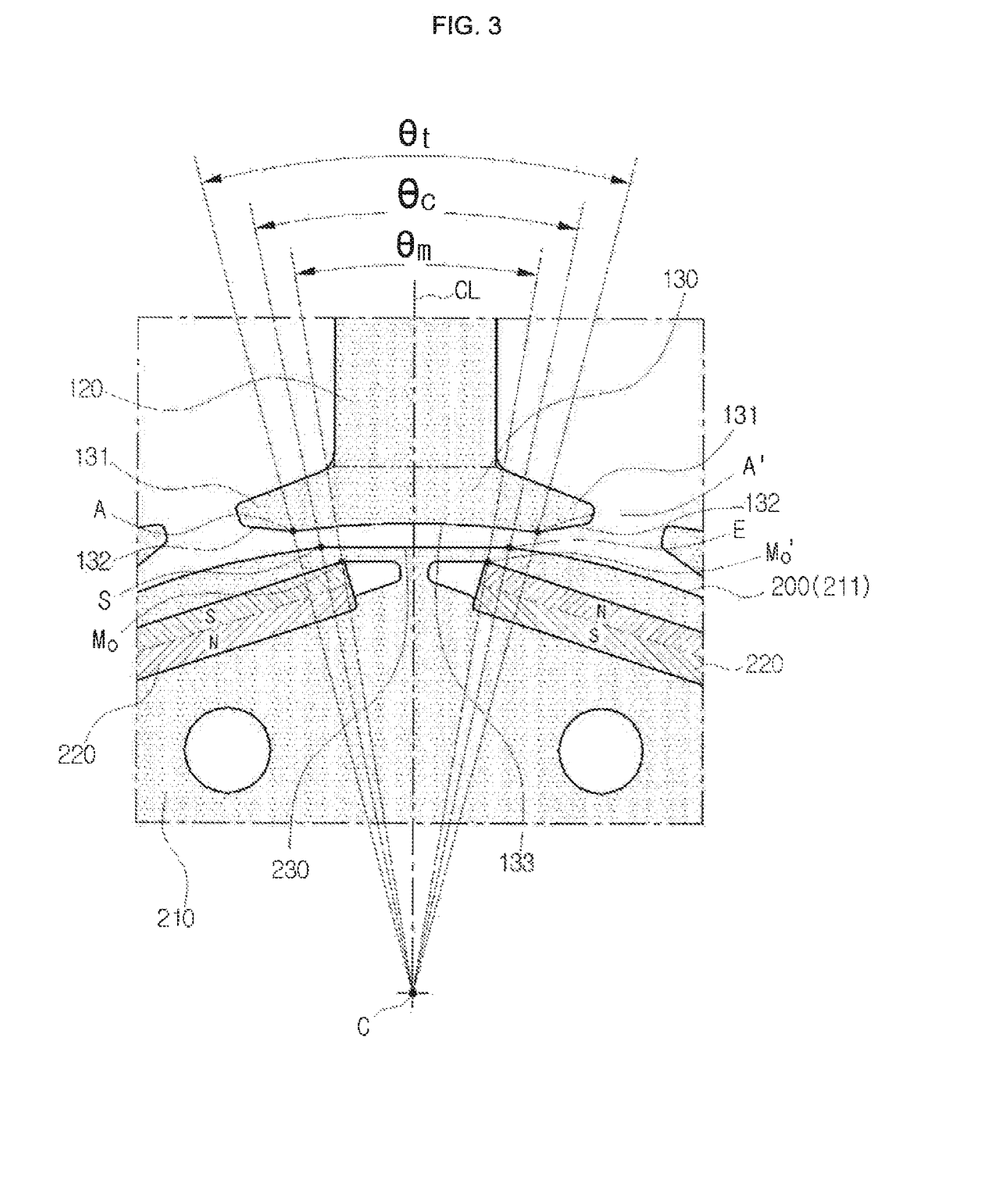
FIG. 3 is a partial enlarged view of the BLDC motor according to the exemplary embodiment of the present invention.

FIG. 2 is a schematic view illustrating a BLDC motor according to an exemplary embodiment of the present invention and FIG. 3 is a partially enlarged view illustrating the BLDC motor according to the exemplary embodiment of the present invention.

As illustrated, a BLDC motor 1000 according to an exemplary embodiment of the present invention includes: a stator 100 which is provided with a plurality of teeth 120 extending toward an inner side of a core 110 and pole shoes 130 each extending to be formed at radial inner end parts of the teeth 120; and rotors 200 which are disposed at an inner side of the stator 100 surrounded by the pole shoes 130 while being spaced apart from the stator 100 and have a plurality of permanent magnets 220 coupled to cores 210 thereof, in which an outer circumferential surface of the rotor 200 may have a circular shape, an outer circumferential surface of a part of an area corresponding to a specific angle range with respect to a rotation center C of the rotor 200 may be formed as a rectilinear straight portion 230, predetermined areas of central parts of radial inner circumferential surfaces of the pole shoe 130 may have an arch shape, and the inner circumferential surfaces of the circumferential both end parts 131 of the pole shoe 130 may be formed so that a distance of the inner circumferential surfaces of the circumferential both end parts 131 of the pole shoe 130 from the outer circumferential surface of the rotor 200 increases as the inner circumferential surfaces of the circumferential both end parts 131 of the pole shoe 130 is far away circumferentially from a central line CL of the pole shoe.

First of all, the stator 100 is a portion fixed to a housing of a motor and the like, and the core 110 may have a cylindrical shape so that an inner center part of the core 110 is empty. The plurality of teeth 120 radially extend from the inner circumferential surface of the core 110 toward the center, and the teeth 120 may be spaced apart from each other in the circumferential direction. In addition, the pole shoes 130 each extend to be formed at the radial inner end parts of the teeth 120, the circumferential both ends of the pole shoe 130 protrude from the tooth 120, such that the tooth 120 and the pole shoe 130 may be formed in a form in which a "T"-letter shape turns upside down as illustrated. In addition, the pole shoes 130 which are formed on the teeth 120 adjacent to each other and are opposite to each other may be formed to be spaced apart from each other at a predetermined interval. In addition, a coil may be wound around the teeth 120, and the wound coil may be disposed between the inner circumferential surface of the core 110 and the radial outer circumferential surface of the pole shoe 130.

The rotor 200 may be disposed at the empty part of the center of the inner side of the stator 100 and may be disposed at the inner side of the stator 100 surrounded by the pole shoes 130 while being spaced apart from the stator 100. At this time, the rotor 200 may be coupled to a rotation shaft whose both ends are coupled to the housing of the motor by a bearing, a bush or the like, such that the rotor 200 may be formed rotatably. In addition, the rotor 200 may be provided with a plurality of permanent magnets 220 which are coupled to the core 210 having a cylinder shape or a cylindrical shape. At this time, the permanent magnets 220 may be slightly spaced apart from each other toward a radial inner side from the outer circumferential surface 211 of the core 210 along the circumferential direction, and each permanent magnet 220 has a straight shape and is disposed to be opposite to each other so that the end parts of neighboring permanent magnets 220 are close to each other, such that a line connecting between the radial outer sides of the plurality of permanent magnets 220 are formed in a circle. The core 210 may be formed in a form in which a plurality of grooves are arranged in a circumferential direction so that the permanent magnet may be inserted into the grooves and coupled thereto. In addition, the permanent magnets 220 have an N pole and an S pole, in which one permanent magnet is disposed so that the N pole is positioned at a radial outer side and the neighboring permanent magnets are disposed so that the S pole is positioned at a radial outer side, such that the plurality of permanent magnets may be alternately arranged along the circumferential direction in such a manner that the positions of the N poles and the S poles are changed.

For example, the stator 100 may have twelve teeth 120, and the rotor 200 may include ten permanent magnets 220 to form ten poles.

In this configuration, when viewing the stator 100 and the rotor 200 in a direction of a rotation central axis or viewing cross sections of the stator 100 and the rotor 200 taken in a vertical direction to the rotation central axis, as illustrated in FIGS. 2 and 3, the outer circumferential surface of the core 210 of the rotor 200 has a circular shape and the outer circumferential surface of the core 210 corresponding to a specific angle range θc with respect to a rotation center C of the rotor 200 may be formed as a rectilinear straight portion 230.

In addition, the inner circumferential surface of the pole shoe 130 of the part corresponding to the specific angle range θt which is a predetermined area of the central part of the radial inner circumferential surface of the pole shoe 130 is formed as an arched arch portion 133, and the inner circumferential surfaces of the circumferential both end parts 131 of the pole shoe 130 may be formed, for example, as the straight portion 132 so that a distance of the inner circumferential surfaces of the circumferential both end parts 131 of the pole shoe 130 from the circular outer circumferential surface of the core 210 of the rotor 200 increases as the inner circumferential surfaces of the circumferential both end parts 131 of the pole shoe 130 is far away circumferentially from a central line CL of the pole shoe at both ends of the arch portion 133.

Therefore, the circular outer circumferential surface 211 of the core 210 which is an outermost surface of the rotor 200 which is close to and faces the arch portion 133 of the inner circumferential surface of the pole shoe 130 which is an innermost surface of the stator 100 in the radial direction are formed so that the distance between the arch portion 133 of the stator 100 and the outer circumference surface 211 of the rotor 200 in the radial direction is constantly formed, but the arch portion 133 of the pole shoe 130 of the stator 100 and the straight portion 230 of the core 210 of the rotor 200 do not have the constant distance in the radial direction and the straight portion 132 which is the inner circumferential surfaces of the radial both end parts 131 of the pole shoe 130 of the stator 100 and the circular outer circumferential surface 211 of the core 210 of the rotor 200 do not have the constant distance in the radial direction from each other.

That is, as the rotor 200 rotates inside the stator 100, the distance between the inner circumferential surface of the pole shoe 130 of the stator 100 and the outer circumferential surface of the core 210 of the rotor 200 is changed, such that the change in the magneto-resistance according to the rotating position of the rotor 200 due to the magnetic flux generated from the permanent magnet 220 of the rotor 200 is reduced, thereby reducing the cogging torque and reducing the torque ripple which is the fluctuation width of the cogging torque.

It can be seen that if the magneto-resistance R is reduced in the state in which a magnetic flux linkage Φ is not changed as in the following Equation 1, the cogging torque $T_{cogging}$ is reduced and a change dR in the magneto-resistance to a change dθ in the rotation angle of the rotor is reduced, and the torque ripple is reduced accordingly.

$$T_{cogging} = -\frac{1}{2}\Phi_g^2 \frac{dR}{d\theta}$$ [Equation 1]

As described above, the BLDC motor of the present invention can reduce the cogging torque and torque ripple by reducing the magneto-resistance between the stator and the rotor, so the counter electromotive force waveform becomes sinusoidal, thereby reducing the noise and vibration of the motor.

In addition, the inner circumferential surfaces of the both end parts 131 of the pole shoe 130 may be formed as the rectilinear straight portions 132.

That is, as shown, the inner circumferential surfaces of the both end parts 131 of the pole shoe 130 may be formed as the rectilinear straight portion 132. At this time, the straight portion 132 may be formed as a straight line which is toward the direction in which it is far away in the circumferential direction and the radial outer side with respect to the central line CL of the pole shoe 130. Although not illustrated, the inner circumferential surfaces of the both end parts 131 of the pole shoe 130 may have a curved shape other than a straight shape.

Therefore, if polarities of the permanent magnet are changed by passing through the pole shoe portion of the stator when the rotor rotates, the magneto-resistance is reduced and the change in the magneto-resistance is reduced accordingly, such that the cogging torque and the torque ripple can be reduced.

In addition, the inner circumferential surfaces of the both end parts 131 of the pole shoe 130 may be formed symmetrically with respect to the central line CL of the pole shoe 130.

That is, as illustrated, the inner circumferential surfaces of the both end parts 131 of the pole shoe 130 are formed as the straight portion 132 so as to be symmetrical with respect to the central line CL of the pole shoe, such that a pair of straight portions 132 may be formed on one pole shoe 130.

In addition, an angle range θt between start points A and A' of the inner circumferential surfaces of the circumferential both end parts 131 of the pole shoe 130 which is formed so that the distance of the inner circumferential surfaces of the circumferential both end parts 131 of the pole shoe 130 from the outer circumferential surface of the rotor 200 increases as the inner circumferential surfaces of the circumferential both end parts 131 of the pole shoe 130 are far away circumferentially from the central line CL of the pole shoe is larger (θm<θt) than an angle range θm between outer side ends Mo and Mo' of the permanent magnets 220 adjacent to each other with respect to the rotation center C of the rotor 200.

That is, at a position where the rotor 200 rotates so that the center between the two permanent magnets 220 adjacent to each other in the circumferential direction is positioned at the central line CL of the pole shoe 130, the angle range θt between the start points A and A' of the straight portion 132 of the pole shoe 130 which are points where the arch portion 133 and the straight portion 132 of the pole shoe 130 of the stator 100 meet each other may be larger (θm<θt) than the angle range θm between the outer side ends Mo and Mo' which are radial outer corners of the part where the two permanent magnets 220 are close to each other with respect to the rotation center C of the rotor. The center of the stator and the rotation center of the rotor may coincide with each other.

Therefore, the magnetic flux generated from the permanent magnets 220 may have a more natural curved shape, such that the magneto-resistance and the change in the magneto-resistance can be efficiently reduced during the rotation of the rotor.

In addition, the straight portion 230 of the outer circumferential surface of the rotor 200 may be disposed at a position between the permanent magnets 220 adjacent to each other.

That is, as illustrated, the straight portion 230 of the core 210 of the rotor 200 may be formed on the outer circumferential surface of the core corresponding to the position between the two permanent magnets 220 adjacent to each other in the circumferential direction. Accordingly, the magneto-resistance is reduced when the polarities of the permanent magnet are changed by passing through the pole shoe while the rotor rotates, and the change in the magneto-resistance is reduced accordingly, such that the cogging torque and the torque ripple can be reduced.

In addition, an angle range $\theta c$ between a start point S and an end point E of the straight portion 230 may be larger ($\theta m < \theta c$) than the angle range $\theta m$ between the outer side ends Mo and Mo' of the permanent magnets 220 adjacent to each other with respect to the rotation center C of the rotor 200.

That is, at a position where the rotor 200 rotates so that the center between the two permanent magnets 220 adjacent to each other in the circumferential direction is positioned at the central line CL of the pole shoe 130, the angle range $\theta c$ between the start point S and the end point E of the straight portion 230 of the core 210 of the rotor 200 with respect to the rotation center C of the rotor may be larger ($\theta m < \theta c$) than the angle range $\theta m$ between the outer side ends Mo and Mo' which are the radial outer corners of the part where the two permanent magnets 220 are close to each other with respect to the rotation center C of the rotor 200. Therefore, the magnetic flux generated from the permanent magnets 220 may have a more natural curved shape, such that the magneto-resistance and the change in the magneto-resistance can be efficiently reduced during the rotation of the rotor.

In addition, the angle range $\theta t$ between the start points A and A' of the inner circumferential surfaces of the circumferential both end parts 131 of the pole shoe 130 which is formed so that the distance of the inner circumferential surfaces of the circumferential both end parts 131 of the pole shoe 130 from the outer circumferential surface of the rotor 200 increases as the inner circumferential surfaces of the circumferential both end parts 131 of the pole shoe 130 are far away circumferentially from the central line CL of the pole shoe may be larger ($\theta t > \theta c$) than the angle range $\theta c$ between the start point S and the end point E of the straight portion 230.

That is, at a position where the rotor 200 rotates so that the center between the two permanent magnets 220 adjacent to each other in the circumferential direction is positioned at the central line CL of the pole shoe 130, the angle range $\theta t$ between the start points A and A' of the straight portion 132 of the pole shoe 132 which are the points where the arch portion 133 and the straight portion 132 of the pole shoe 130 of the stator 100 meet each other with respect to the rotation center C of the rotor may be larger ($\theta t > \theta c$) than the angle range $\theta c$ between the start point S and the end point E of the straight portion 230 of the core 210 of the rotor 200 with respect to the rotation center C of the rotor. Therefore, the magnetic flux generated from the permanent magnets 220 may have a more natural curved shape, such that the magneto-resistance and the change in the magneto-resistance can be efficiently reduced during the rotation of the rotor.

Figure 4:
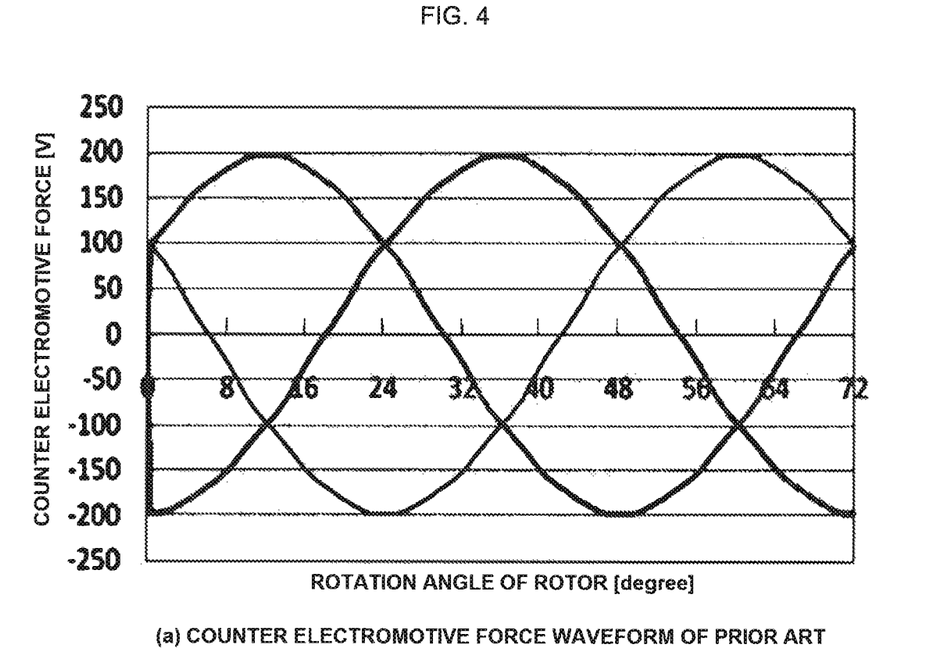
FIG. 4 is a graph illustrating a counter electromotive force waveform of the conventional BLDC motor.
Figure 5:
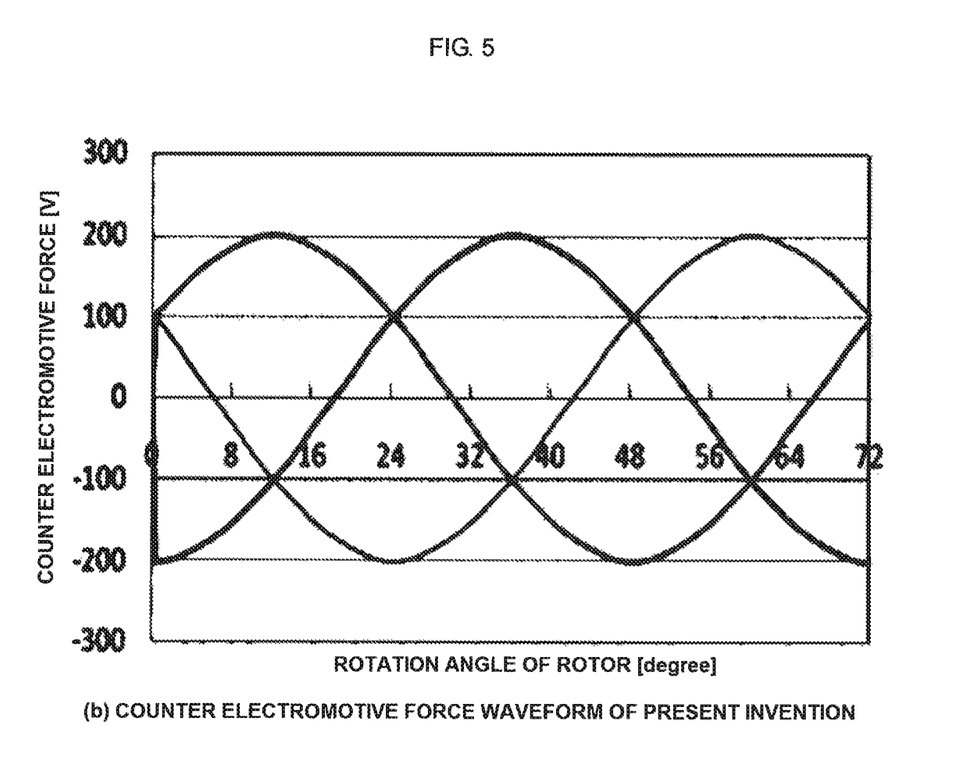
FIG. 5 is a graph illustrating a counter electromotive force waveform of the BLDC motor according to the exemplary embodiment of the present invention.
Figure 6:
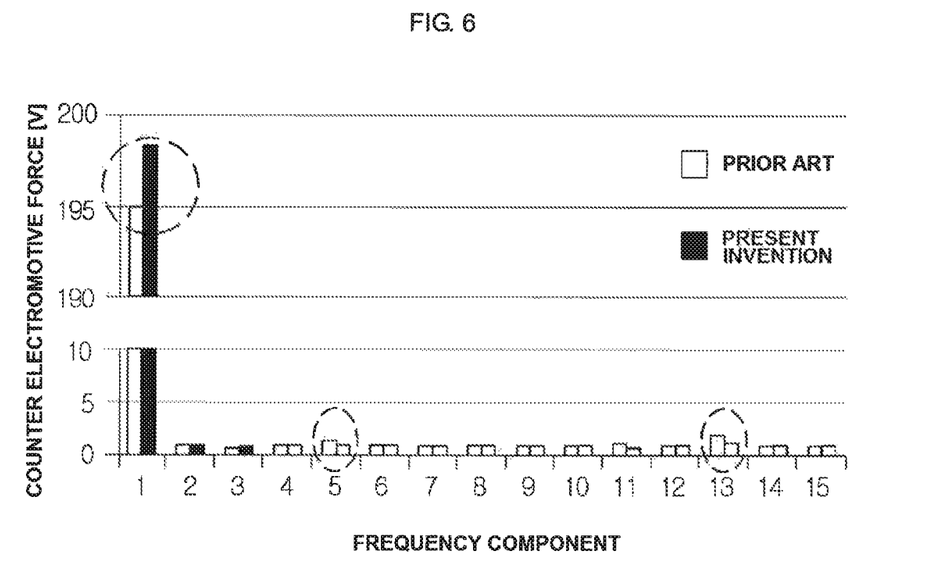
FIG. 6 is a comparative graph illustrating a result of converting and analyzing the counter electromotive force waveforms of the conventional BLDC motor and the BLDC motor of the present invention.
Figure 7:
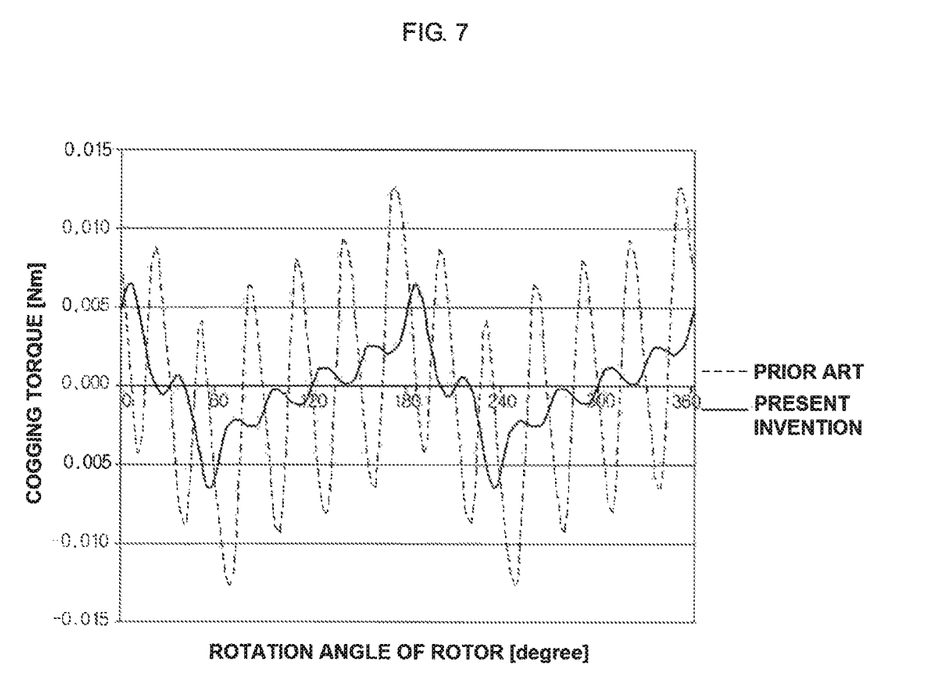
FIG. 7 is a comparative graph illustrating changes in cogging torques of the conventional BLDC motor and the BLDC motor of the present invention according to a rotation angle of a rotor.

As described above, when the inner circumferential surfaces of the circumferential both end parts 131 of the pole shoe 130 of the stator 100 are formed as the straight portion 132, the rectilinear straight portions 230 are formed on the outer circumferential surface of the core 210 of the rotor 200, and $\theta t > \theta c$, the counter electromotive force waveform is sinusoidal, such that the cogging torque and the torque ripple can be reduced. It can be seen that the counter electromotive force waveform of the motor of the present invention as illustrated in FIG. 5 is more sinusoidal than the counter electromotive force waveform of the motor in which the whole inner circumferential surface of the pole shoe of the conventional stator has an arch shape and the whole outer side surface of the core of the rotor is formed as a circumferential surface as illustrated in FIG. 4, and it can be seen that when the counter electromotive force waveform is analyzed as illustrated in FIG. 6, in fast Fourier transform (FFT) of the counter electromotive force waveform of the present invention, a fundamental wave component corresponding to the first on a horizontal axis is increased by 4V and harmonic components corresponding to the fifth and the thirteenth are reduced compared to the related art. Accordingly, it is possible to reduce the noise and vibration of the motor by reducing the cogging torque and the torque ripple. As a result, as illustrated in FIG. 7, the motor of the present invention shows a reduction in the cogging torque by about 48% as compared with the conventional motor. Here, the magnitude of the counter electromotive force and the shape of the counter electromotive force waveform may be determined by the shapes of the permanent magnet of the rotor, the pole shoe of the stator, and the rotor, and the cogging torque may also be determined by the shapes of the permanent magnet, the pole shoe of the stator, and the rotor like the shape of the counter electromotive force. Also, an amount of current flowing at the time of driving the motor depends on a voltage supplied from an inverter. As the shape of the counter electromotive force is closer to the voltage that can be supplied from the inverter, the torque ripple or vibration at the time of the driving of the motor may be reduced. Also, if the fundamental wave component of the counter electromotive force is increased, the performance is not improved unconditionally, and the range of the driving speed may be determined according to the fundamental wave amplitude of the counter electromotive force. However, as the harmonic components contained in the counter electromotive force waveform is increased, the vibration or noise may grow worse.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

1000: BLDC motor
100: Stator
110: Core
120: Teeth
130: Pole shoe
131: End part
132: Straight portion
133: Arch portion
200: Rotor
210: Core
211: Outer circumferential surface
220: Permanent magnet
230: Straight portion
A, A': Start point of straight portion of pole shoe of stator
Mo, Mo': Outer side end of permanent magnet
S: Start point of straight portion of rotor
E: End point of straight portion of rotor
C: Rotation center of rotor
CL: Central line of pole shoe

The invention claimed is:

1. A brushless direct current (BLDC) motor, comprising: a stator which is provided with a plurality of teeth extending toward an inner side of a core and pole shoes each extending to be formed at radial inner end parts of the teeth; and rotor which is disposed at an inner side of the stator surrounded by the pole shoes while being spaced apart from the stator and have a plurality of permanent magnets coupled to cores thereof; wherein an outer circumferential surface of the rotor has a circular shape, an outer circumferential surface of a part of an area corresponding to a specific angle range with respect to a rotation center (C) of the rotor is formed as a rectilinear straight portion, and the straight portion of the rotor is formed in a shape of a single straight line connecting a start point (S) and an end point (E) to each other; and predetermined areas of central parts of radial inner circumferential surfaces of the pole shoe have an arch shape;

the inner circumferential surfaces of the circumferential both end parts of the pole shoe are formed to be more radially outward as being farther away from both ends of the arch-shaped inner circumferential surface of the central part of the pole shoe in an outer circumferential direction, respectively;

wherein the inner circumferential surfaces of the circumferential both end parts of the pole shoe are formed as the rectilinear straight portions.

2. The brushless direct current motor of claim 1, wherein the inner circumferential surfaces of the both end parts of the pole shoe are formed symmetrically with respect to the central line (CL) of the pole shoe.

3. The brushless direct current motor of claim 1, wherein an angle range θt between start points (A) and (A') of the inner circumferential surfaces of the circumferential both end parts of the pole shoe which is formed so that the distance of the inner circumferential surfaces of the circumferential both end parts of the pole shoe from the outer circumferential surface of the rotor increases as the inner circumferential surfaces of the circumferential both end parts of the pole shoe are far away circumferentially from the central line (CL) of the pole shoe is larger (θm<θt) than an angle range θm between outer side ends Mo and Mo' of the permanent magnets adjacent to each other with respect to the rotation center (C) of the rotor.

4. The brushless direct current motor of claim 1, wherein the straight portion of the outer circumferential surface of the rotor is disposed at a position between the permanent magnets adjacent to each other.

5. The brushless direct current motor of claim 4, wherein an angle range θc between a start point (S) and an end point (E) of the straight portion is larger (θm<θc) than an angle range θm between outer side ends Mo and Mo' of the permanent magnets adjacent to each other with respect to the rotation center (C) of the rotor.

6. The brushless direct current motor of claim 4, wherein an angle range θt between start points (A) and (A') of the inner circumferential surfaces of the circumferential both end parts of the pole shoe which is formed so that the distance of the inner circumferential surfaces of the circumferential both end parts of the pole shoe from the outer circumferential surface of the rotor increases as the inner circumferential surfaces of the circumferential both end parts of the pole shoe are far away circumferentially from the central line (CL) of the pole shoe is larger (θt>θc) than an angle range θc between a start point S and an end point E of the straight portion.

* * * * *